A. P. TIESSEN.
INTERNAL COMBUSTION ENGINE.
APPLICATION FILED APR. 9, 1913.
1,116,338.
Patented Nov. 3, 1914.
2 SHEETS—SHEET 1.
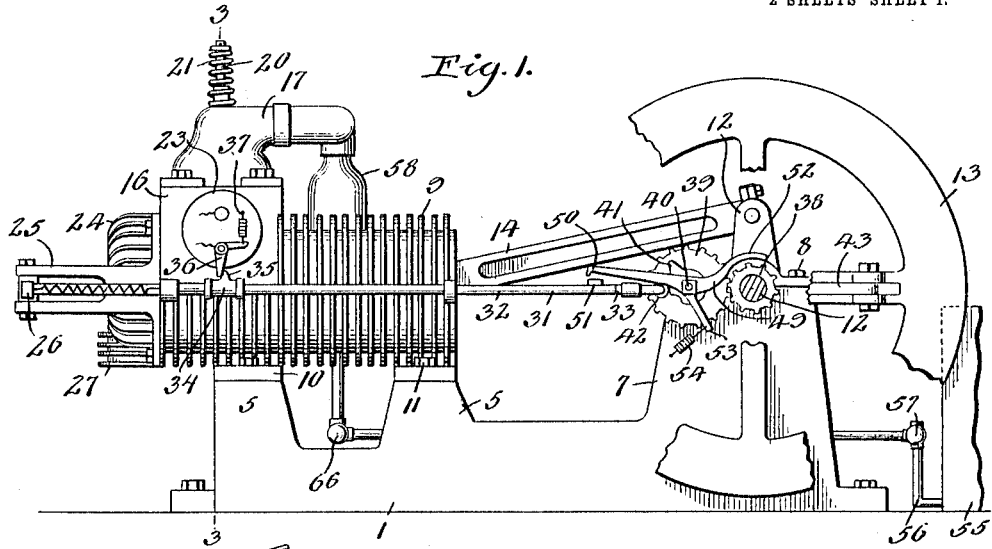
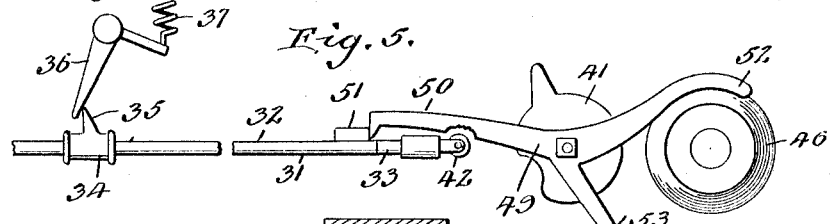
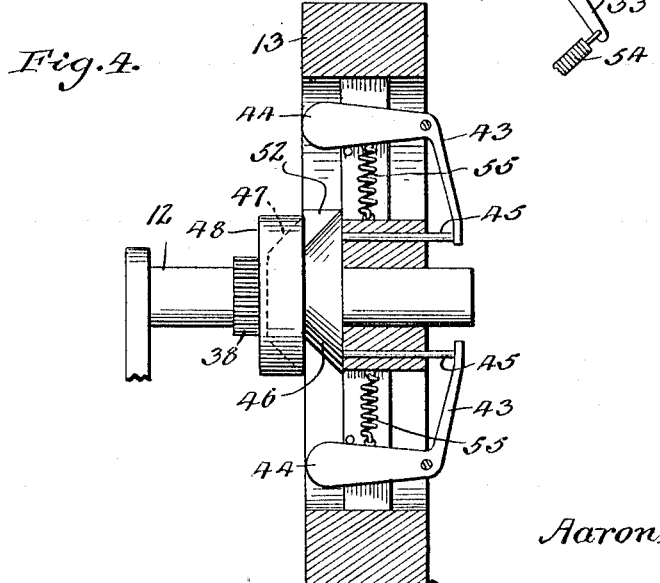
Witnesses
Inventor
Aaron P. Tiessen,
By Frank O. Parker,
Attorney

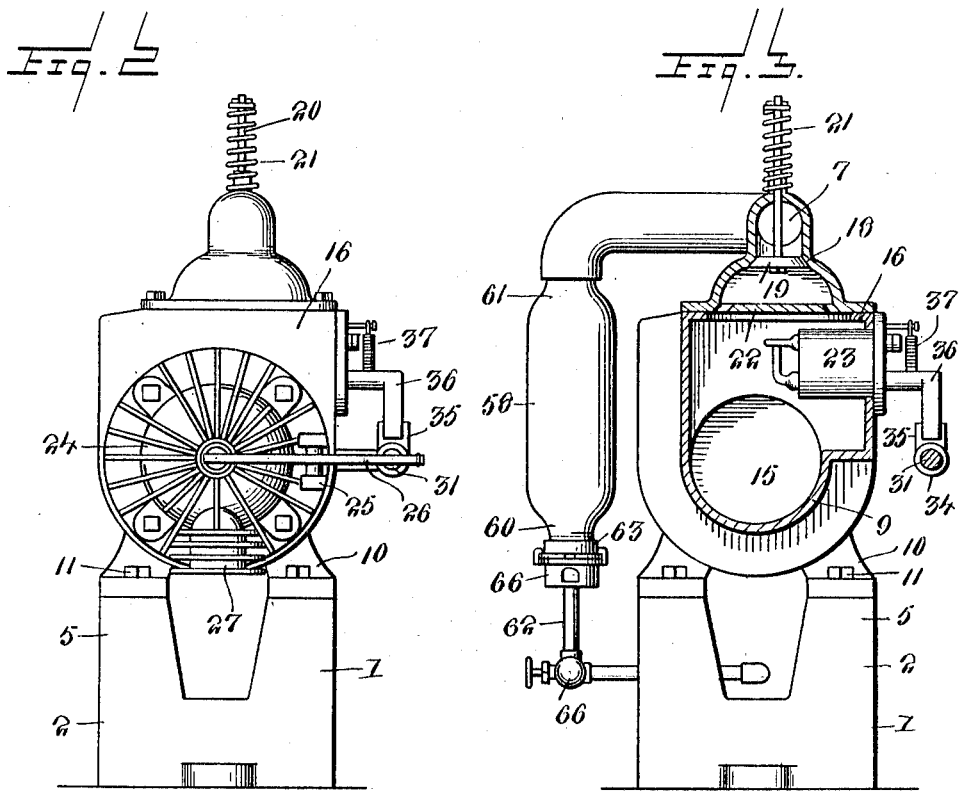

UNITED STATES PATENT OFFICE.

AARON P. TIESSEN, OF MOUNTAIN LAKE, MINNESOTA.

INTERNAL-COMBUSTION ENGINE.

1,116,338. Specification of Letters Patent. Patented Nov. 3, 1914.

Application filed April 9, 1913. Serial No. 759,898.

*To all whom it may concern:*

Be it known that I, AARON P. TIESSEN, a citizen of the United States of America, residing at Mountain Lake, State of Minnesota, have invented certain new and useful Improvements in Internal-Combustion Engines, of which the following is a specification.

This invention relates to improvements in explosive engines and has particular application to internal combustion engines of the reciprocating type.

In carrying out the present invention, it is my purpose to provide an internal combustion engine capable of delivering relatively great power as compared with engines of this class heretofore constructed and wherein the fluid employed as a propelling agent will be carbureted in such manner as to produce a gas which when taken into the engine cylinder and exploded will give up its full quota of energy and expand to its maximum capacity, thereby avoiding waste of fuel, smoking in the exhaust and other disagreeable and detrimental effects. It is also my purpose to provide an explosive engine which will embrace the desired features of simplicity, efficiency, durability and strength coupled with cheapness of cost in maintenance and installation and which will deliver maximum power with a minimum fuel consumption. Furthermore, I aim to provide a novel form of mixer or carbureter by means of which the fluid employed as a propelling agent will be mixed or commingled with air so as to produce a highly combustible gaseous mixture.

A further object of my invention is to provide an explosive engine wherein by means of a governor mechanism controlling the exhaust valve and the igniter, the speed of the engine will be kept constant, stalling of the engine under heavy loads eliminated, and racing avoided.

It is my intention to improve and simplify the general construction of explosive engines and to provide an engine in which access may be readily had to the various parts for cleaning, repairing and other purposes.

With the above and other objects in view, the invention consists in the construction, combination and arrangement of parts hereinafter set forth in and falling within the scope of the claims.

In the accompanying drawings; Figure 1 is a view in side elevation of an engine constructed in accordance with my present invention. Fig. 2 is a view in end elevation of the engine. Fig. 3 is a cross sectional view on the line 3—3 of Fig. 1. Fig. 4 is a cross sectional view through the fly wheel carrying the governor mechanism, parts of the latter being shown in elevation. Fig. 5 is a view of a detail of the governor mechanism.

In the present instance, I have shown the several features of my invention as applied to an internal combustion engine of the horizontal stationary type. Certain of the features however are applicable to explosive engines of various characters and it will be understood that the invention is therefore not limited to the particular type of engine as delineated in the drawings, as I contemplate such modifications and changes which may be made in order to adapt the invention to the best advantage according to the circumstances and requirements in any particular case.

Referring now to the accompanying drawings in detail, the numeral 1 indicates the base of an engine formed, in the present instance, of a metallic block 2 of substantially rectangular contour having rearwardly extending arms 3, 3 formed integral with one edge thereof and connected to each other adjacent to their free ends through the medium of a cross piece 4, while uprising from the metallic block 2 adjacent to the corners thereof are standards or posts 5 having bolt holes 6 formed therein, standards 7, 7 upstanding from the respective arms 3, 3 adjacent to the free ends thereof and carrying bearings or boxings 8.

The numeral 9 indicates the cylinder of an engine which, in the present instance, is of the air cooled type and is equipped with outwardly extending lugs 10 resting upon the upper ends of the standards or posts 5 and formed with openings alining with the bolt holes 6 in the posts to receive bolts 11 whereby the cylinder is securely fastened to the base and capable of removal therefrom when such is desired. Journaled in the boxings or bearings 8 on the standards 7 is a crank shaft 12 equipped in the present instance with a fly wheel 13 at each end thereof on the outer sides of the standards and having connected to the crank portion thereof the pitman 14 of a piston 15 mounted for reciprocatory or rectilinear movement within the cylinder 9.

Appropriately connected to or formed integral with the cylinder 9 adjacent to the head end thereof and in open communication with the explosion chamber of such cylinder is a casing 16 formed with an intake port or passage 17 disposed in the present instance in a horizontal plane, said casing having formed therein between the intake and explosion chamber a valve seat 18 adapted to seat a vertically movable inlet valve 19 having a vertical stem 20 extending outwardly of the upper wall of the casing and encircled by an expansion spring 21, the latter having one end contacting with the wall of the casing and the opposite end bearing against a pin passed through the free extremity of the valve stem and exerting its tension to hold the inlet valve 19 of the cylinder normally closed. In the embodiment of my invention herein shown the inlet valve 19 opens on the intake or suction stroke of the piston, as will be readily understood, while the casing 16 at a point below the inlet valve therein is equipped with a deflector plate 22 arranged in a plane parallel with that of the valve 19 and designed to break up the incoming gas so that a highly combustible mixture will fill the cylinder. In this instance, the ignition device is in the form of a make and break sparker 23 of any appropriate or preferred construction and has the sparking terminals thereof disposed below the deflector plate 22 and in the path of the incoming gases so that when the spark takes place, the gas in the cylinder as well as that in the casing 16 will be exploded.

The cylinder head is indicated at 24 and is preferably detachably connected with the respective end of the cylinder and has formed thereon an outwardly extending yoke 25 having pivoted between the free ends of the limbs thereof, a valve lever 26. Formed in the head 24 is an exhaust port 27 controlled by an inwardly opening exhaust valve 28 having a stem 29 extending through the head and terminating in the path of movement of one end of the valve lever 26, a coiled expansion spring 30 encircling the exhaust valve stem 29 and having the opposite ends thereof engaging, respectively, a pin passed through the free end of the valve stem and the adjacent portion of the wall of the head, the spring acting to hold the exhaust valve normally closed.

Journaled in suitable alining bearings formed on or carried by the cylinder 9 and the standard 7 is the exhaust valve push rod 31 formed in the presence instance of two axially alining sections 32, 33. Embracing the section 32 of the exhaust valve push rod and preferably adjustably mounted thereon is a collar 34 equipped with an upwardly extending trip arm 35 adapted to contact a trip lever 36 connected to the movable electrode or igniter hammer of the make and break sparking device, the free end of the section 32 of the push rod being designed to contact the free extremity of the exhaust valve lever 26 so as to move the exhaust valve to open position against the action of the spring 30 and thereby permit the burnt or spent gases to escape or be driven from the cylinder. The trip lever 36 of the ignition device is preferably in the form of a bell crank lever and has connected to the free arm thereof one end of a contractile spring 37, the free end of the latter being fastened to an appropriate part of the casing 16. In the present instance, a gear pinion 38 is keyed upon the crank shaft 12 adjacent to the inner face of one of the fly wheels 13 and meshes with a gear 39 journaled upon a stub shaft 40 carried by the standard 7, a cam 41 being fixed to one face of the gear 39 and rotatable therewith and designed to contact a roller 42 on the free end of the section 33 of the exhaust valve push rod. From this construction, it will be seen that when the piston 15 is reciprocating within the cylinder 9 the crank shaft 12 will be rotated and a rectilinear or sliding movement transmitted to the exhaust valve push rod 31. Thus, the burnt or spent gases of combustion will, at the proper time, be permitted to escape from the cylinder by way of the exhaust port 27 in the head 24, the exhaust valve 28 being opened by the valve lever 26, the latter being actuated by the push rod. Simultaneous with the movement of the lever 26 to open the exhaust valve, the trip arm 35 on the collar 34 engages the trip lever 36 of the hammer or movable electrode of the make and break igniting device so as to render the sparking device inoperative. Succeeding the exhaust stroke of the piston, the latter moves inwardly and draws a charge of fresh gas into the cylinder by way of the inlet valve, the following stroke of the piston compressing the charge while the igniter operates to explode such charge at the proper time, the engine carrying on its phases or cycles of operation in the usual or well known manner.

In the present instance, I employ a centrifugal governor mechanism for controlling the exhaust valve push rod 31 so that the exhaust valve will be held open and the sparker against operation when the speed of the engine exceeds the normal. This governor mechanism, in the present instance, comprises bell crank levers 43, 43 each pivoted at its bight to the fly wheel 13 of the engine adjacent to the gear pinion 38 and having the horizontal arms thereof weighted as at 44, while the vertical arms are connected to or adapted to contact with pins 45 slidably mounted within the bores in the hub of the fly wheel and connected to a frusto-conical disk 46 adapted to slide within a similarly shaped recess 47 formed in a disk 48 rigidly secured to the gear pinion 38. Pivoted upon the upright 7 adjacent to the fly wheel carrying the governor mechanism is an angle lever 49 having one end 50 disposed in the path of movement of a lug 51 formed on the section 32 of the exhaust valve push rod, while the opposite end 52 of the angle lever is cut to conform to the frusto-conical disk 46 and normally rests against such disk, as clearly illustrated in Fig. 7, the lever 49 having a downwardly extending arm 53 connected to one extremity of a contractile spring 54 the free end of the latter being connected to an appropriate part of the base 1. This spring acts normally to hold the end 50 of the angle lever out of the path of movement of the lug 51 and the end 52 of such lever in frictional engagement with the disk 46. In the normal condition of the bell crank levers 43, 43 of the governor mechanism, the weighted arms 44 are held at their limits of inward movement by contractile springs 55 thereby holding the disk 46 out of the recess 47 in the disk 48 and the end 50 of the lever 49 out of the path of movement of the lug 41 on the exhaust valve push rod. When, however, the speed of the engine increases above the normal or in such manner to cause "racing," the weights 44 on the bell crank levers fly outwardly under the action of centrifugal force and so slide the pins 45 within the bores in the hub of the fly wheel, consequently throwing the frusto-conical disk 46 into the recess 47 in the disk 48 whereby the end 52 of the angle lever 49 is elevated against the action of the spring 54, and the end 50 of the lever depressed or disposed in the path of the lug 51 on the exhaust valve push rod. In this position of the parts the section 32 of the exhaust valve push rod is prevented from returning to valve closing position thereby holding the exhaust valve open and preventing the sparking device from operating so that no charge will be taken into the engine and no spark made to create an explosion.

The supply tank for the engine is indicated at 55 and is conveniently located with respect to the engine and has leading therefrom a supply pipe 56 connecting with the inlet 17 of the casing 16, a suitable check valve 57 being located in the supply pipe as usual. In order that the oil from the supply tank 55 may be readily carbureted or mixed with air so as to form an efficient explosive gas, I interpose between the supply tank and the intake valve of the engine a mixing or carbureting device composed of a cylindrical tube 58 forming a mixing chamber 59 and provided with restricted axially alining inlet and discharge or outlet openings 60, 61 respectively. Leading into the inlet opening 60 of the mixing chamber and disposed approximately centrally thereof is a nozzle 62 connected to the tank side of the supply pipe, while threaded onto the wall of the intake 60 is a collar 63 having an outwardly extending annular flange 64 preferably slotted at diametrically opposite points to receive inturned lugs 65 formed on one end of a regulating valve 66 having openings adapted to register with air openings formed in the lower wall of the inlet 60 of the mixer. To the outlet 61 is connected the engine side of the supply pipe as clearly illustrated in the drawings.

From this construction, it will be seen that the liquid fuel within the reservoir or supply tank will be drawn into the chamber 59 through the nozzle 62 in the form of a spray, while air will be sucked or drawn into the chamber by way of the valve 66 and permitted to mix or commingle freely with the spray of liquid thereby forming a highly combustible gaseous mixture, which, when drawn into the cylinder and ignited, gives up its full quota of work. By means of the valve 66 the quantity of air passing into the mixing chamber 59 may be regulated as will be apparent.

From the foregoing description taken in connection with the accompanying drawings, the construction and mode of operation of my invention will be readily apparent. It will be seen that I have provided an explosive engine wherein a highly combustible charge of gas is delivered to the engine cylinder, so that the maximum power may be derived from the engine, while the operation of the engine is automatically controlled or governed so as to avoid racing or stalling, the latter happening when a load is suddenly applied to the engine crank shaft.

While I have herein shown and described one preferred form of my invention by way of illustration, I desire to have it understood that I do not limit or confine myself to the precise details of construction herein described and delineated, as modification and variation may be made within the scope of the claims and without departing from the spirit of the invention.

I claim:

1. In a hydrocarbon engine, the combination with a cylinder and a piston therein adapted to be reciprocated, inlet and exhaust valves for the cylinder, a make and break spark device therein, and a governor mechanism controlling said exhaust valve and sparking device and adapted, when the engine exceeds the normal speed, to hold the exhaust valve open and the sparking device inoperative, said governor mechanism comprising weighted bell crank levers adapted to operate under the action of centrifugal force, a frusto-conical disk adapted to be moved under the action of said levers, a second disk having a recess formed therein to receive the first disk, a pivot lever having one end bearing upon said first disk and the opposite end adapted to be rendered operative to hold the exhaust valve open and the sparker against operation, and means for returning said lever to normal position.

2. In a hydrocarbon engine, the combination with a cylinder and piston therein adapted to be reciprocated, inlet and exhaust valves for the cylinder and a make and break spark device therein, of a push rod for opening said exhaust valve and comprising axially alining sections, means for operating said push rod, a lug on one section of said push rod, a governor mechanism controlling said exhaust valve and spark device and adapted, when the engine exceeds the normal speed, to hold the exhaust valve open and the spark device inactive, said mechanism comprising weighted bell crank levers adapted to operate under the action of centrifugal force, a frusto-conical disk adapted to be moved under the action of said levers, a second disk having a recess formed therein to receive said first disk, a lever pivoted between its ends and having one end bearing upon the periphery of said first disk and the opposite end disposed adjacent to the path of movement of the lug on the respective section of said push rod and adapted to be thrown into such path in the movement of said first-named disk under the action of said bell crank levers whereby the respective section of said push rod will be held against movement under the action of said means, and means for returning said lever to normal position when the speed of the engine is reduced.

3. In a hydrocarbon engine, the combination with a cylinder and piston therein adapted to be reciprocated, inlet and exhaust valves for the cylinder and a make and break spark device therein, of a push rod for opening said exhaust valve and comprising axially alining sections, means for operating said push rod, a lug on one section of said push rod, a governor mechanism controlling said exhaust valve and spark device and adapted, when the engine exceeds the normal speed, to hold the exhaust valve open and the spark device inactive, said mechanism comprising weighted bell crank levers adapted to operate under the action of centrifugal force, a frusto-conical disk adapted to be moved under the action of said levers, a second disk having a recess formed therein to receive said first disk, a lever pivoted between its ends and having one end bearing upon the periphery of said first disk and the opposite end disposed adjacent to the path of movement of the lug on the respective section of said push rod and adapted to be thrown into such path in the movement of said first-named disk under the action of said bell crank levers whereby the respective section of said push rod will be held against movement under the action of said means, an arm connected to said lever and projecting downwardly therefrom, and a spring connected to said arm and acting to restore the lever to normal position succeeding the cutting down of the speed of the engine.

4. In a hydrocarbon engine, the combination with a cylinder and piston therein adapted to be reciprocated, inlet and exhaust valves for said cylinder and a make and break spark device therein, of a governor mechanism controlling said exhaust valve and spark device and adapted, when the engine exceeds the normal speed, to hold the exhaust valve open and the spark device inactive, said governor mechanism comprising a frusto-conical disk, a second disk having a recess therein to receive the first disk, a lever pivoted between its ends and having one end bearing upon the periphery of said first-named disk and the opposite end designed to hold the exhaust valve open and the spark device against operation, and means governed by the speed of the engine for sliding said first disk into said second-named disk whereby said lever will be actuated.

5. In a hydrocarbon engine, the combination with a cylinder and piston therein adapted to be reciprocated, inlet and exhaust valves for said cylinder and a make and break spark device therein, of a governor mechanism controlling said exhaust valve and spark device and adapted, when the engine exceeds the normal speed, to hold the exhaust valve open and the spark device inactive, said governor mechanism comprising a frusto-conical disk, a second disk having a recess therein to receive the first disk, a lever pivoted between its ends and having one end bearing upon the periphery of said first-named disk and the opposite end designed to hold the exhaust valve open and the spark device against operation, and means governed by the speed of the engine and operable under the action of centrifugal force to slide said first-named disk into said second-named disk whereby said lever will be actuated.

6. In a hydrocarbon engine, the combination with a cylinder and piston therein adapted to be reciprocated, inlet and exhaust valves for said cylinder and a make and break spark device therein, of a governor mechanism controlling said exhaust valve and spark device and adapted, when the engine exceeds the normal speed, to hold the exhaust valve open and the spark device inactive, said governor mechanism comprising a frusto-conical disk, a second disk having a recess therein to receive the first disk, a lever pivoted between its ends and having one end bearing upon the periphery of said first-named disk and the opposite end designed to hold the exhaust valve open and the spark device against operation, means governed by the speed of the engine and operable under the action of centrifugal force to slide said first-named disk into said second-named disk whereby said lever will be actuated, and means for restoring said lever to normal position succeeding the cutting down of the speed of the engine.

7. In a hydrocarbon engine, the combination with a cylinder and piston therein adapted to be reciprocated, inlet and exhaust valves for said cylinder and a make and break spark device therein, of a governor mechanism controlling said exhaust valve and spark device and adapted, when the engine exceeds the normal speed, to hold the exhaust valve open and the spark device inactive, said governor mechanism comprising a frusto-conical disk, a second disk having a recess therein to receive the first disk, a lever pivoted between its ends and having one end bearing upon the periphery of said first-named disk and the opposite end designed to hold the exhaust valve open and the spark device against operation, means governed by the speed of the engine and operable under the action of centrifugal force to slide said first-named disk into said second-named disk whereby said lever will be actuated, and a spring connected to said lever for restoring the same to normal position succeeding the cutting down of the speed of the engine.

8. In a hydrocarbon engine, the combination with a cylinder and piston therein adapted to be reciprocated, inlet and exhaust valves for the cylinder and a make and break spark device therein, of a push rod for opening said exhaust valve and comprising axially alining sections, a cam for operating said push rod, a lug on one section of said push rod, a governor mechanism controlling said exhaust valve and spark device and adapted, when the engine exceeds the normal speed, to hold the exhaust valve open and the spark device inactive, said mechanism comprising weighted bell crank levers adapted to operate under the action of centrifugal force, a frusto-conical disk adapted to be moved under the action of said levers, a second disk having a recess formed therein to receive said first disk, a lever pivoted between its ends and having one end bearing upon the periphery of said first disk and the opposite end disposed adjacent to the path of movement of the lug on the respective section of said push rod and adapted to be thrown into such path in the movement of said first-named disk under the action of said bell crank levers whereby the respective section of said push rod will be held against movement under the action of said cam, and means for returning said lever to normal position when the speed of the engine is reduced.

In testimony whereof I affix my signature in presence of two witnesses.

AARON P. TIESSEN.

Witnesses:
PETER A. TIERZEN,
D. G. HIELERT.

Copies of this patent may be obtained for five cents each, by addressing the "Commissioner of Patents, Washington, D. C."